L. GRANGES.
SELF CLOSING JOINT FOR VESSELS.
APPLICATION FILED JAN. 24, 1910.
971,989.
Patented Oct. 4, 1910.
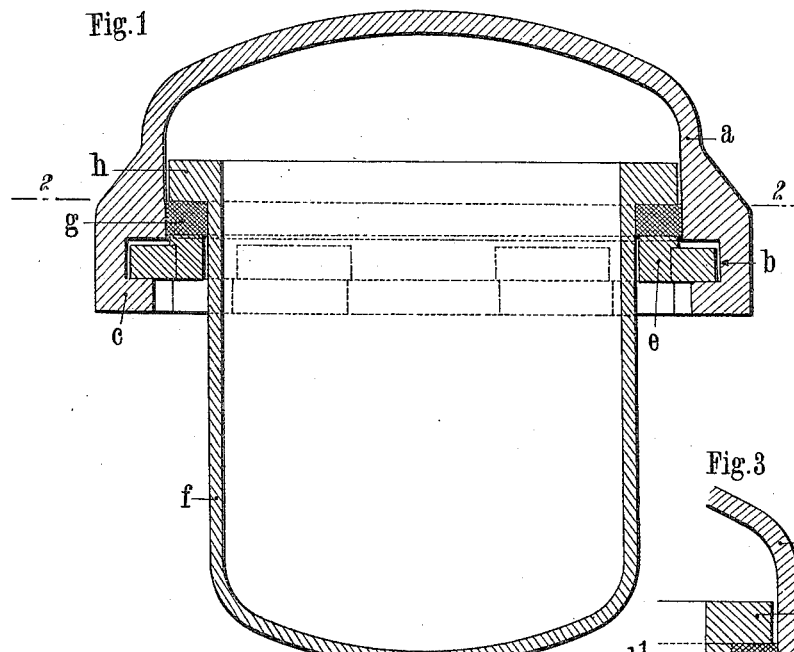
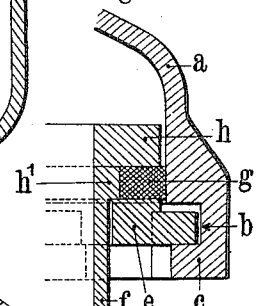
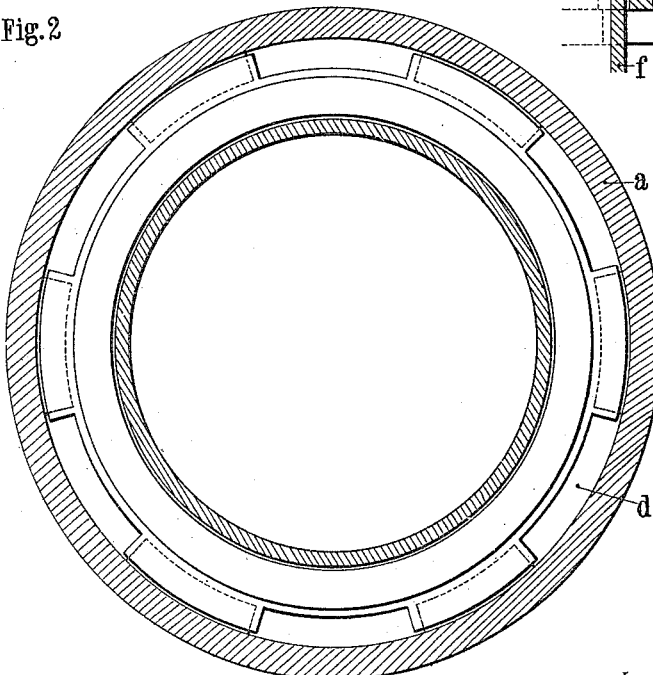
WITNESSES
INVENTOR
Louis Granges
BY
ATTORNEYS

UNITED STATES PATENT OFFICE.

LOUIS GRANGES, OF PARIS, FRANCE.

SELF-CLOSING JOINT FOR VESSELS.

971,989.  Specification of Letters Patent.  Patented Oct. 4, 1910.

Application filed January 24, 1910. Serial No. 539,713.

*To all whom it may concern:*

Be it known that I, LOUIS GRANGES, engineer, a citizen of the French Republic, residing at 25 Boulevard Barbès, Paris, in the Republic of France, have invented certain new and useful Improvements in and Relating to Self-Closing Joints for Vessels, of which the following is a specification.

The object of this invention is a self-closing joint for vessels of any and every kind.

Devices of this sort at present in use are generally provided with a door, or stopper, which must be introduced in a certain position into the mouth or opening of the vessel so as to fit against the edge of such opening, where it is held in position by the pressure in the vessel or recipient. For larger openings the door is held in place by means of bolts, a system which increases the time required for placing the door, and renders accidents possible through failure to tighten the bolts.

The particular object of this invention is to facilitate and at the same time render more rapid, the placing of the closure, and also to increase its tightness and reliability.

In the annexed drawing, which represents a form of construction of the invention: Figure 1 is a vertical section of a vessel provided with the closing device. Fig. 2 is a section along the line 2—2 of Fig. 1. Fig. 3 is a form of embodiment of the invention for use more particularly in vessels subject to great pressures.

The self-closing cover $a$ comprises an annular groove $b$, the flange $c$ of which is fashioned so as to make spaces $d$ alternate with full parts. A washer $e$, sliding on the body $f$ of the vessel to be closed, is also fashioned so as to have full parts corresponding to the spaces of the flange in order to penetrate into the interior of the annular groove $b$. A packing ring $g$ of suitable material, for example of india-rubber, is interposed between this washer $e$ and the flange $h$ of the vessel.

In order to use the device of the invention, the cover $a$ is placed on the vessel to be closed, the packing ring $g$ is put in position, and the washer $e$ appears under the cover $a$, so that the full parts penetrate into the spaces $d$ of the flanges $c$, and then lodge in the annular groove $b$. The washer $e$ is then turned so that its full parts rest on the full parts of the flange $c$, thus locking the whole. If a fluid of any kind under pressure is then introduced into the interior of the vessel $f$, this fluid, in acting against the cover $a$, presses it outward, thus compressing energetically the packing ring $g$ between the washer $e$ and the flange $h$, and effect a closure which increases in tightness with the pressure in the interior of the vessel.

When the device is subject to high pressures, the tightening of the washer $e$ on the flange $h$ of the vessel increases, and in this case, there is danger that the plastic packing $g$ be compressed to excess, or crushed, and escape through the closure. This inconvenience is obviated by the embodiment of the invention according to Fig. 3, consisting of a shoulder $h^1$, arranged below the flange $h$, forming a stop, and serving to limit the possible drawing together of the parts $e$ and $h$. The height of the flange $h^1$, is such that the plastic packing $g$ is sufficiently compressed to secure tightness, but not compressed to excess, and thus obviating the above-mentioned inconveniences.

This closing device is of simple and economical construction. Its use is facilitated by the fact that in order to effect the closing it suffices to turn the washer $e$, of relatively insignificant weight, instead of being obliged to rotate the self-closing cover itself. The effort being equally spread over all the teeth or full parts of the cover and washer, the reliability of the closure is increased. This device renders possible the locking by self-closure of vessels of every shape.

The cover $a$ may be provided with suitable working devices, as also the washer $e$, and a safety device may be furnished for the purpose of preventing the entry of the fluid except when the closure is in position.

The invention can be used for closing vessels of every kind serving to contain either liquids or gases under pressure.

Having now particularly described and ascertained the nature of my said invention and in what manner the same is to be performed, I declare that what I claim is:—

1. In a self-closing joint for vessels a circular flange at the edge of the vessel, a cover surrounding the flange and having an enlarged edge extending beyond the flange of the vessel, an annular groove in the enlarged edge, a washer fitting in the groove and capable of sliding on the body of the vessel, and a resilient packing ring between the washer and the circular flange on the vessel.

2. In a self-closing joint for vessels, a circular flange at the edge of the vessel, a cover with enlarged edge fitting on the vessel, an annular groove in the said enlarged edge, recesses cut in the outer flange formed by the groove, a washer fitting in the groove of recesses cut in the washer and corresponding to that of the outer flange of the annular groove, and a resilient packing ring between the washer and the circular flange of the vessel.

3. In a self-closing joint for vessels, a circular flange at the edge of the vessel, a circular shoulder between said flange and the body of the vessel, a cover surrounding the flange and having an enlarged edge extending beyond the flange of the vessel, an annular groove in said enlarged edge, a washer fitting in the groove and bearing on the shoulder on the vessel, and a resilient packing ring around said shoulder, between the washer and the circular flange of the vessel.

4. In a self-closing joint for vessels, a circular flange at the edge of the vessel, a circular shoulder between said flange and the body of the vessel, a cover surrounding the flange and having an enlarged edge extending beyond the flange of the vessel, an annular groove in said enlarged edge, recesses cut in the outer flange formed by the groove, a washer fitting in the groove and bearing on the shoulder of the vessel, recesses cut in said washer, corresponding to that of the outer flange of the groove, and a resilient packing ring around said shoulder, between the washer and the circular flange of the vessel.

In testimony whereof I have hereunto placed my hand at Paris, France, this 31st day of December 1909.

LOUIS GRANGES.

In the presence of two witnesses:—
H. C. COXE,
HENRY SCHWAB.